US011430194B2

(12) United States Patent
Alun-Jones et al.

(10) Patent No.: US 11,430,194 B2
(45) Date of Patent: Aug. 30, 2022

(54) 2D GRAPHICAL CODING TO CREATE A 3D IMAGE

(71) Applicant: UNMADE LIMITED, London (GB)

(72) Inventors: Benjamin Alun-Jones, London (GB); Hal Watts, London (GB); Kirsty Emery, London (GB); Greg Bakker, London (GB)

(73) Assignee: Unmade Limited, London (GB)

( * ) Notice: Subject to any disclaimer, the term of this patent is extended or adjusted under 35 U.S.C. 154(b) by 0 days.

(21) Appl. No.: 15/549,002

(22) PCT Filed: Feb. 5, 2016

(86) PCT No.: PCT/EP2016/052571
§ 371 (c)(1),
(2) Date: Aug. 4, 2017

(87) PCT Pub. No.: WO2016/124777
PCT Pub. Date: Aug. 11, 2016

(65) Prior Publication Data
US 2018/0025547 A1 Jan. 25, 2018

(30) Foreign Application Priority Data
Feb. 6, 2015 (GB) ..................................... 1502018

(51) Int. Cl.
*G06T 19/20* (2011.01)
*G06T 15/04* (2011.01)
*G06T 17/00* (2006.01)
*G06T 11/00* (2006.01)
*G06T 9/00* (2006.01)

(52) U.S. Cl.
CPC ............ *G06T 19/20* (2013.01); *G06T 11/001* (2013.01); *G06T 15/04* (2013.01); *G06T 17/00* (2013.01); *G06T 9/00* (2013.01); *G06T 2200/24* (2013.01); *G06T 2210/16* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS 8,174,539 B1 * 5/2012 Samaniego ........... G06T 11/001
345/581
8,553,045 B2 * 10/2013 Skaff ....................... G09G 5/06
345/589

(Continued)

FOREIGN PATENT DOCUMENTS

CN          104036532          9/2014

OTHER PUBLICATIONS

English Translation of CN 1040365432 Abstract. (2 pages).
(Continued)

*Primary Examiner* — Hilina K Demeter
(74) *Attorney, Agent, or Firm* — Conley Rose, P.C.

(57) ABSTRACT

There is disclosed a method of creating a three-dimensional image comprising: establishing a mapping between a two-dimensional template and the three-dimensional image; applying a graphic to the two-dimensional template; receiving the two-dimensional template with the graphic applied; and creating the three-dimensional image based on the mapping and the applied graphic.

19 Claims, 9 Drawing Sheets

(56) References Cited

U.S. PATENT DOCUMENTS

| | | | |
|---|---|---|---|
| 9,536,344 B1* | 1/2017 | Baszucki | A63F 13/655 |
| 9,665,981 B2* | 5/2017 | Lehrer | A41H 3/007 |
| 2010/0305909 A1* | 12/2010 | Wolper | G06T 17/00 |
| | | | 703/1 |
| 2011/0299762 A1* | 12/2011 | Marre | G06T 7/97 |
| | | | 382/154 |
| 2013/0124156 A1* | 5/2013 | Wolper | G06T 17/00 |
| | | | 703/1 |
| 2013/0127889 A1* | 5/2013 | Winnemoeller | G06T 17/20 |
| | | | 345/582 |
| 2014/0267310 A1* | 9/2014 | Moll | G06T 13/20 |
| | | | 345/473 |
| 2014/0267406 A1* | 9/2014 | Mullins | G06T 11/001 |
| | | | 345/633 |
| 2014/0333614 A1* | 11/2014 | Black | G06T 19/20 |
| | | | 345/419 |
| 2015/0066189 A1* | 3/2015 | Mulligan | G06Q 30/0621 |
| | | | 700/136 |
| 2015/0084955 A1* | 3/2015 | Chen | G06T 17/00 |
| | | | 345/420 |
| 2016/0027200 A1* | 1/2016 | Corazza | G06T 15/04 |
| | | | 345/420 |
| 2016/0379419 A1* | 12/2016 | Khalili | G06T 19/20 |
| | | | 345/419 |

OTHER PUBLICATIONS

PCT Published Application of PCT/EP2016/052571 published Aug. 11, 2016 (33 pages).
International Search Report of PCT/EP2016/052571 dated Apr. 27, 2016 (3 pages).
Written Opinion of PCT/EP2016/052571 dated Apr. 27, 2016 (5 pages).

* cited by examiner

2D GRAPHICAL CODING TO CREATE A 3D IMAGE

CROSS REFERENCE TO RELATED APPLICATIONS

This application is the U.S. National Stage entry under 35 U.S.C. § 371 of International Patent Application No. PCT/EP2016/052571, filed Feb. 5, 2016, and entitled "2D Graphical Coding to Create a 3D Image," and GB Application No. 1502018.3 filed Feb. 6, 2015 and entitled "2D Graphical Coding to Create a 3D Image," both of which are incorporated by reference herein in their entireties for all purposes.

STATEMENT REGARDING FEDERALLY SPONSORED RESEARCH OR DEVELOPMENT

Not applicable

BACKGROUND

Field of the Invention

The present disclosure is concerned with applying a graphic to a three-dimensional image. The disclosure is particularly but not exclusively concerned with implementations in which the graphic is applied to a three-dimensional image of an item of clothing.

Description of the Related Art

It is known in the art to apply a graphic to a three-dimensional image, and to edit a graphic applied to a three-dimensional image.

Typically this requires the use of computer software packages to both generate the image and to create/edit the image. The use of associated computer tools to create/edit the image provides a poor user experience.

This disclosure provides an improved technique for applying a graphic to a three-dimensional image.

This disclosure further provides an improved technique for editing a graphic applied to a three-dimensional image.

SUMMARY OF THE DISCLOSURE

There is provided a method of creating a three-dimensional image comprising: establishing a mapping between a two-dimensional template and the three-dimensional image; applying a graphic to the two-dimensional template; receiving the two-dimensional template with the graphic applied; and creating the three-dimensional image based on the mapping and the applied graphic.

In an embodiment, the method further comprises: mapping a plurality of points of the two-dimensional template to a respective plurality of points of the three-dimensional image; and mapping a plurality of points of the graphic applied to the two-dimensional template to the three-dimensional image based on said mapping.

In an embodiment, the method further comprises: mapping a plurality of predetermined points of the two-dimensional template to a respective plurality of predetermined points on the three-dimensional image; and based on said mapping, mapping a plurality of points of the graphic applied to the two-dimensional template to the three-dimensional image.

In an embodiment, the method may comprise defining a plurality of reference points on the two-dimensional template, wherein the plurality of reference points uniquely identify the template.

The plurality of reference points may additionally define a reference grid for mapping positions on the two-dimensional template to positions on the three-dimensional image.

In an embodiment, the method may further comprises: transposing the two-dimensional template to the three-dimensional image with the graphic applied thereto.

In an embodiment, the method may further comprise: applying the graphic to the two-dimensional template by hand.

In an embodiment, the method may further comprise: scanning the two-dimensional pattern after applying the graphic.

In an embodiment, the method may further comprise: applying the graphic to the two-dimensional template using a computer tool.

The image may comprise a plurality of components. In an embodiment, the method may comprise: selecting a component of the graphic; and editing the selected component. Editing the selected component may comprise: selecting a colour, and applying the selected colour to the component. Editing the selected component may comprise: selecting a pattern; and applying the selected pattern to the component.

The editing of a selected component may result in a change to the manufacture of an article according to the three-dimensional image, which may be the three-dimensional image. For example where a colour is changed, then the manufactured article is changed to manufacture utilising that changed colour. This may require changing an element of the manufacturing process to allow this change. In the example of a colour change, the manufacturing process may be changed to change to a yarn of a different colour.

As such, a region or component of the article can be selected and changed, and then a corresponding change is applied in the manufacturing process to produce a suitably changed manufacturing article.

In an example, based on the two-dimensional template, a three-dimensional virtual image and a three-dimensional physical image (or object) may be created. The three-dimensional virtual image is a representation of what the three-dimensional physical image (or object) will look like. By selecting and changing a region or component of the three-dimensional virtual image, the three-dimensional physical image that is manufactured will change, because the manufacturing is changed based on the change to the three-dimensional virtual image. The three-dimensional physical image and the three-dimensional virtual image can be generated separately or simultaneously.

Advantageously, in certain embodiments, the three-dimensional virtual image is generated based on the two-dimensional template, and the three-dimensional physical image (or object) is not manufactured.

Advantageously, in certain embodiments, the three-dimensional virtual image is generated, then the three-dimensional physical image (or object) is manufactured.

Advantageously, in certain embodiments, the three-dimensional virtual image is generated, then edited by selecting and changing components or regions, and then the three-dimensional physical image is manufactured with any edits applied to three-dimensional virtual object incorporated in the manufacturing process to produce a suitably change three-dimensional physical image.

Selecting the component may comprise selecting the component on the three-dimensional image.

The method may comprise manufacturing an article corresponding to the three-dimensional image.

The graphic may be a coding representing editing to be applied to the three-dimensional image.

A computer program product for storing computer program code may, when executed on a computer, perform any of the described methods or processes.

A computer program may comprise computer program code which, when executed on a computer, performs any described method or process.

There is further provided a computer for creating a three-dimensional image, the computer configured to: establish a mapping between a two-dimensional template and the three-dimensional image; applying a graphic to the two-dimensional template; receive the two-dimensional template with a graphic applied; and create the three-dimensional image based on the applied graphic and the mapping.

There is provided a two-dimensional template for creating a three-dimensional image, the two-dimensional template comprising: a plurality of reference points, the reference points establishing a mapping between the two-dimensional template and the three-dimensional image; and a pattern for receiving a graphical image.

There is provided a method for creating a three-dimensional image, comprising: providing a two-dimensional template, the two-dimensional template having a plurality of reference points such that each point on the two-dimensional template maps to a point on a three-dimensional image; and applying coding to the three-dimensional template by adding graphical information to the two-dimensional image.

BRIEF DESCRIPTION OF THE DRAWINGS

The disclosure that follows is described with reference to the accompanying figures, in which.

DESCRIPTION OF EXEMPLARY EMBODIMENTS

Disclosed now is an example with reference in particular to the application of a technique for transposing a graphic applied to a two-dimensional template to a three-dimensional image of an item of clothing for fitting to a person. However the disclosure is more broadly applicable, as will be apparent to one skilled in the art.

Figure 1:
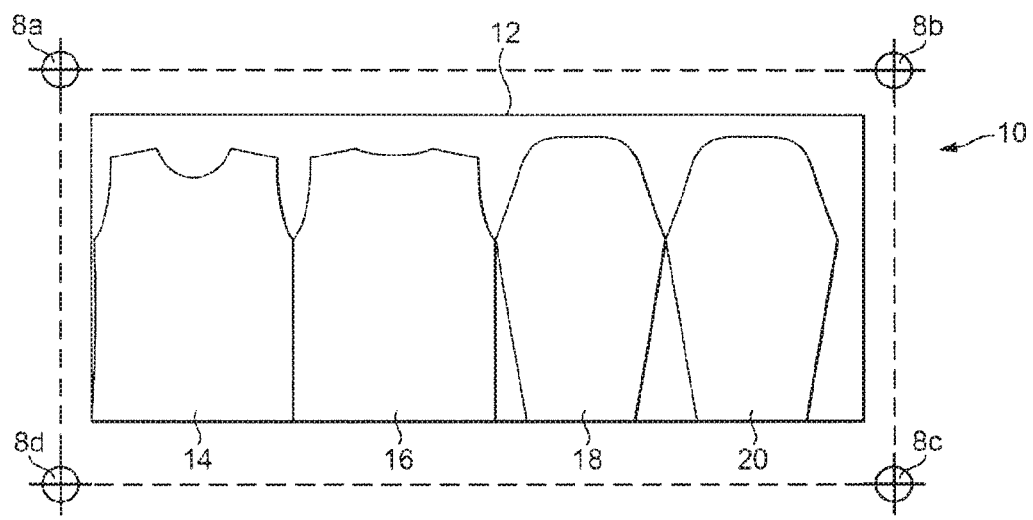
FIG. 1 illustrates a two-dimensional template.

Reference numeral 10 of FIG. 1 shows an example of a two-dimensional template 12. The two-dimensional template 12 defines a pattern. The pattern is the pattern for an item of clothing. The pattern comprises a first part 14 being the front of the item of clothing, a second part 16 being the rear of the item of clothing, a third part 18 being one arm of the item of clothing, and a fourth part 20 being a second arm of the item of clothing.

The two-dimensional template is also shown as including four reference points 8a, 8b, 8c, 8d. The reference points 8a, 8b, 8c, 8d are illustrated as the circled four corners of a rectangle, which rectangle encompasses the pattern 12. The reference points are provided to permit the mapping of the template. The reference points are provided to allow each point within the area of the pattern 12 to be mapped, by allowing each point to be located within a reference grid provided by the points 8a, 8b, 8c, 8d.

The reference points are preferably separately visible to the pattern. The reference points may be visible as part of the visible pattern and not discernible as reference points.

The reference points may be specifically provided as separate to any part of the pattern, or may be provided as part of the pattern. Where the reference points are provided as distinct visible points, it may be preferable to provide them as distinct points separate to the pattern, preferably external to the area of the pattern such as is shown in FIG. 1.

The number of reference points may vary, and be implementation dependent. The number may be dependent upon the technique used to facilitate the mapping.

The reference points on the two-dimensional template are associated with corresponding reference points on a three-dimensional image to which the pattern on the two-dimensional template is to be mapped.

The reference points, when displayed, may be used to convey additional information. For example, they could represent a sequence of numbers, which are unique to a particular representation of a two-dimensional template, and provide a unique code for that two-dimensional template. When a graphic is applied to that two-dimensional template, this unique code is then associated with that graphic. The reference points may include at least one point which identifies the orientation of the pattern.

Figure 2:
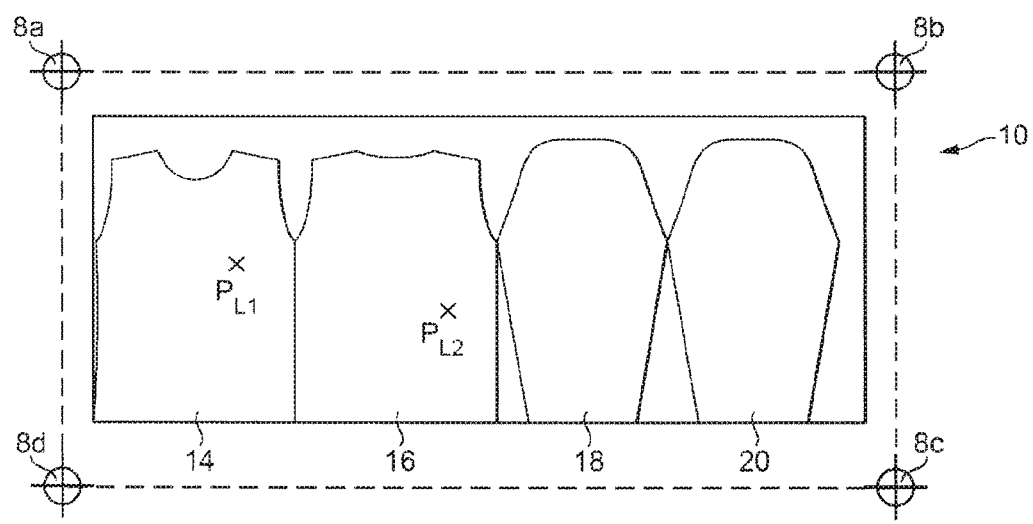
FIG. 2 illustrates location points on a two-dimensional template.
Figure 3:
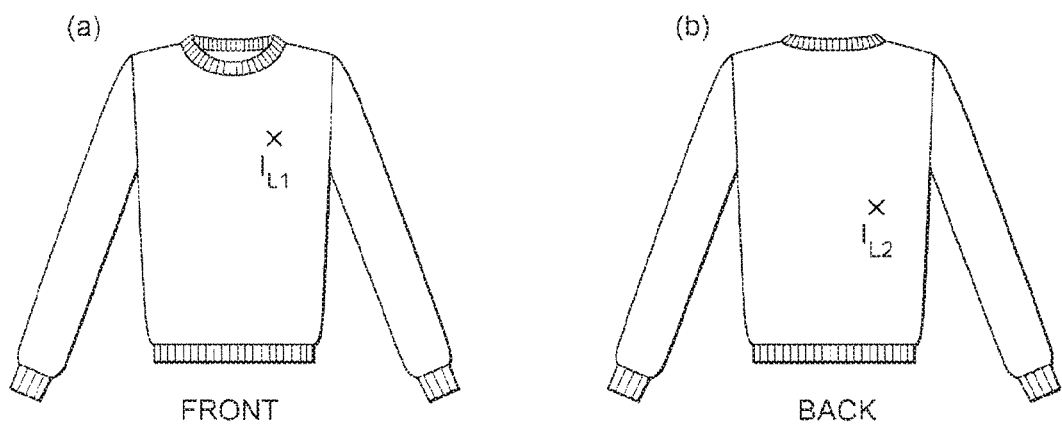
FIGS. 3(a) and 3(b) illustrate location points on a three-dimensional image.

This mapping is illustrated further with reference to FIGS. 2, 3(a) and 3(b).

Based on the reference points 8a, 8b, 8c, 8d, each location of the two-dimensional pattern 12 can be mapped to a position on a the three-dimensional image.

FIG. 2 illustrates two locations $P_{L1}$ and $P_{L2}$ within the pattern 12. Each location maps to a position on a three-dimensional image, which can be considered to be a three dimensional image template.

FIG. 3(a) illustrates an example perspective view of the front of a three-dimensional image of an item of clothing, and FIG. 3(b) illustrates an example perspective view of the rear of the three-dimensional image of the item of clothing. The three-dimensional image of the item of clothing is a fixed image, and the two locations $I_{L1}$ and $I_{L2}$ are shown on the three-dimensional image. In this example the location $P_{L1}$ is mapped to the location $I_{L1}$, and the location $P_{L2}$ is mapped to the location $I_{L2}$. Thus every location of every part of the two-dimensional image can be mapped to a location on the three-dimensional image.

This provides a reference matrix for every point on the two-dimensional image: every point on the two-dimensional template can be mapped to a point on the three-dimensional image. Thus every point on the graphic applied to the two-dimensional template can be mapped to a point on the three-dimensional image. Thus, a graphic applied to the reference template can be mapped to the three-dimensional image, and applied to the three-dimensional image for display on the three-dimensional image.

Advantageously a graphic can be shown on a three-dimensional image without having to be drawn on to the three-dimensional image. A graphic can be drawn on a two-dimensional pattern, and that drawn graphic transposed for display on the three-dimensional image.

Any graphic applied to the two-dimensional template which is not a part of the pattern is not mapped to the three-dimensional image, and not shown on it.

The two-dimensional template defines a pattern and any parts thereof. This is a two-dimensional representation of the three-dimensional image.

The two-dimensional template is a standard template, which may also be referred to as a reference template. The two-dimensional template will always be the same for a given three-dimensional image.

The two-dimensional template is presented for editing by a user, in order to allow a user graphic to be displayed on a three-dimensional image, and the two-dimensional template may be presented to a user in a variety of ways.

In one arrangement, the two-dimensional template is presented on a physical element. For example, the two-dimensional template may be printed onto a piece of paper, card or fabric.

In another arrangement, the two-dimensional template is presented as a digital image on a computer display. The display may be associated with any computing device, such as a desk-top computer, a laptop computer, a tablet device, or smartphone for example.

In general, the two-dimensional template is presented in a form for a user to apply a graphic to it, and therefore the two-dimensional template may be manifested in any suitable form to allow this.

The graphic is any image or representation which can be applied to a three-dimensional image with which the two-dimensional template is associated. Where the three-dimensional image is an image of an item of clothing, the graphic may represent a design which is to be applied to the item of clothing. The three-dimensional image may be a representation of the item of clothing in isolation, or a representation of the item of clothing as worn by an individual.

When the two-dimensional template is presented printed on a physical element, such as paper, the graphic may be applied to the two-dimensional template using a pen, preferably using coloured pens. Use of coloured pens allows the graphic to be applied in different colours.

When the two-dimensional template is provided on a computer display, the graphic may be applied using any appropriate drawings software package for editing the displayed representation of the two-dimensional template. When the two-dimensional template is provided on the display of a tablet, the application of the graphic may simulate drawing using a pen, with a graphic being 'drawn' on the computer image using appropriate interactive pen devices in conjunction with appropriate editing software.

However the graphic is applied to the two-dimensional template, and however the two-dimensional template is manifested, the graphic may itself comprise patterns and colours.

Figure 4:
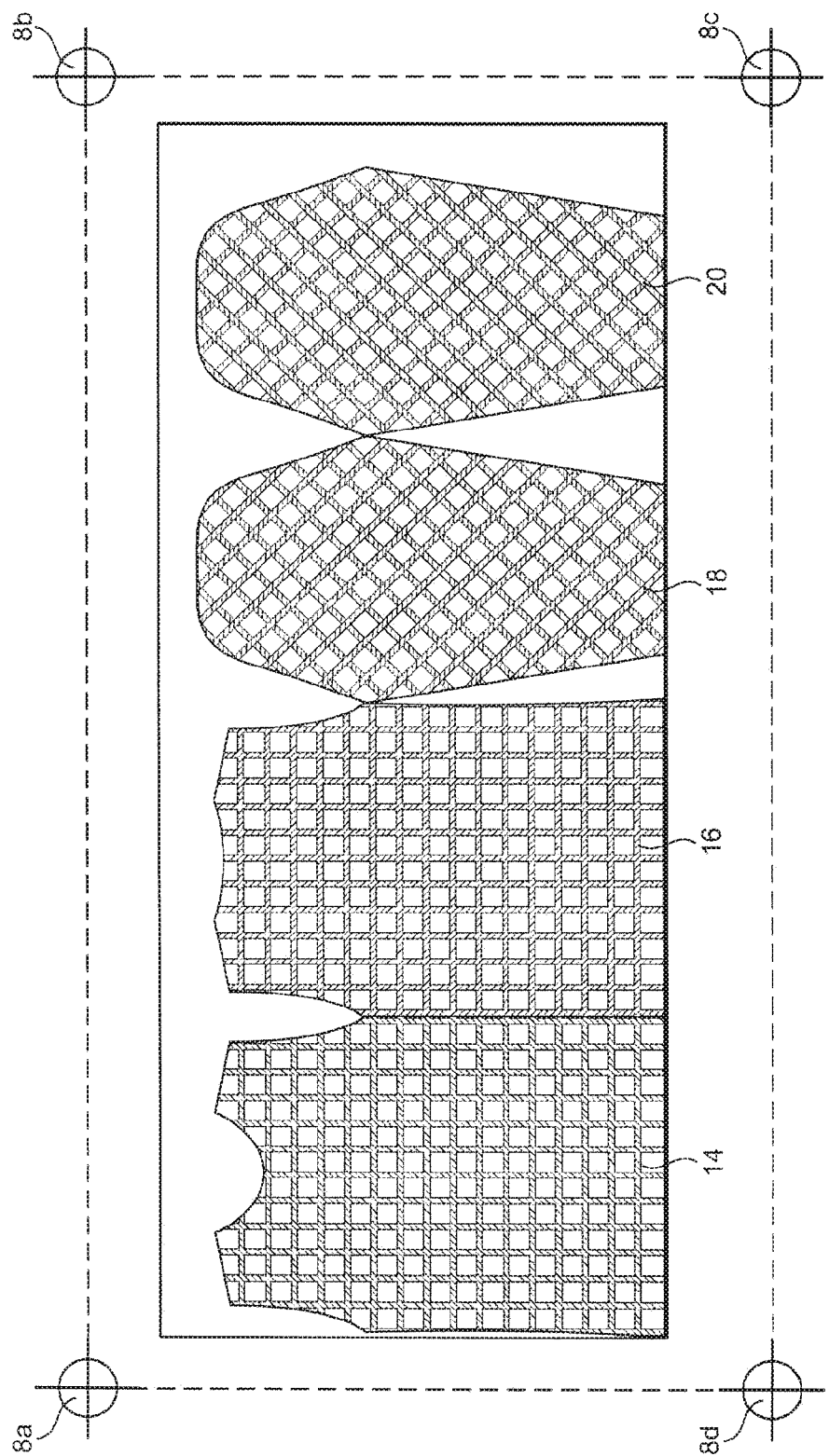
FIG. 4 illustrates a graphic applied to a two-dimensional template.

An example of a graphic applied to a two-dimensional template is shown in FIG. 4.

As shown in FIG. 4, a series of horizontal and vertical stripes are drawn on the first part 14 and the second part 16. These two parts are respectively drawn in a first and second colour, as represented by the dark shading (or shading which includes a wavy line) in part 14, and the light shading (or shading that does not include a wavy line) in part 16.

A series of crossing diagonal stripes is drawn on the third part 18 and the fourth part 20. These are drawn in the two different colours, corresponding to the two different colours used for parts 14 and 16. In part 18 the left leaning vertical lines are coloured in the same colour as the first part 14, as illustrated by the dark shading (or shading which includes a wavy line). In part 18 the right leaning vertical stripes are coloured in the same colour as the second part 16, as illustrated by the light shading (or shading which does not include a wavy line). In part 20 the right leaning vertical stripes are coloured in the same colour as the first part 14, as illustrated by the dark shading (or shading which includes a wavy line). In part 18 the left leaning vertical stripes are coloured in the same colour as the second part 16, as illustrated by the light shading (or shading which does not include a wavy line). The dark shading (or shading which includes a wavy line) may be indicative of a blue colour, and the light shading (or shading which does not includes a wavy line) may be indicative of a red colour.

The two-dimensional template may have associated with it a series of icons showing the colours which are available to be applied to the three-dimensional image. Only certain colours may be applied the three dimensional object, and these may be shown with the two-dimensional template. The colours which may be applied to the three-dimensional image will be determined by the software application running the transposition of the two-dimensional template to the three-dimensional image. Further, as will be discussed hereinbelow, the three-dimensional image of an item of clothing may be manufactured, and the colours available for use on the three-dimensional image may be limited to the colours which are used in the manufacturing process. The series of icons may show these colours.

The display of the colours which are available may be provided with the ability for a user to link a colour in their graphic to a colour which is available. For example a user may colour part of the graphic in green, but the green they are using may be a different shade of green to that which is available to be applied to the three-dimensional image. The user may then enter the green colour they are using next to the green colour available, to show that the available green colour should be applied to the image where they have used their green colour.

Where the two-dimensional template is displayed on a computer display, and a user utilises a drawings package to apply the graphic, there may also be displayed the colours which are available, and the user may similarly index the colour they are using to the colour available. Alternatively a software package running may automatically allocate the colour being used to one of the available colours. This may be done by limiting the selection of colours to only those colours available.

Figure 5:
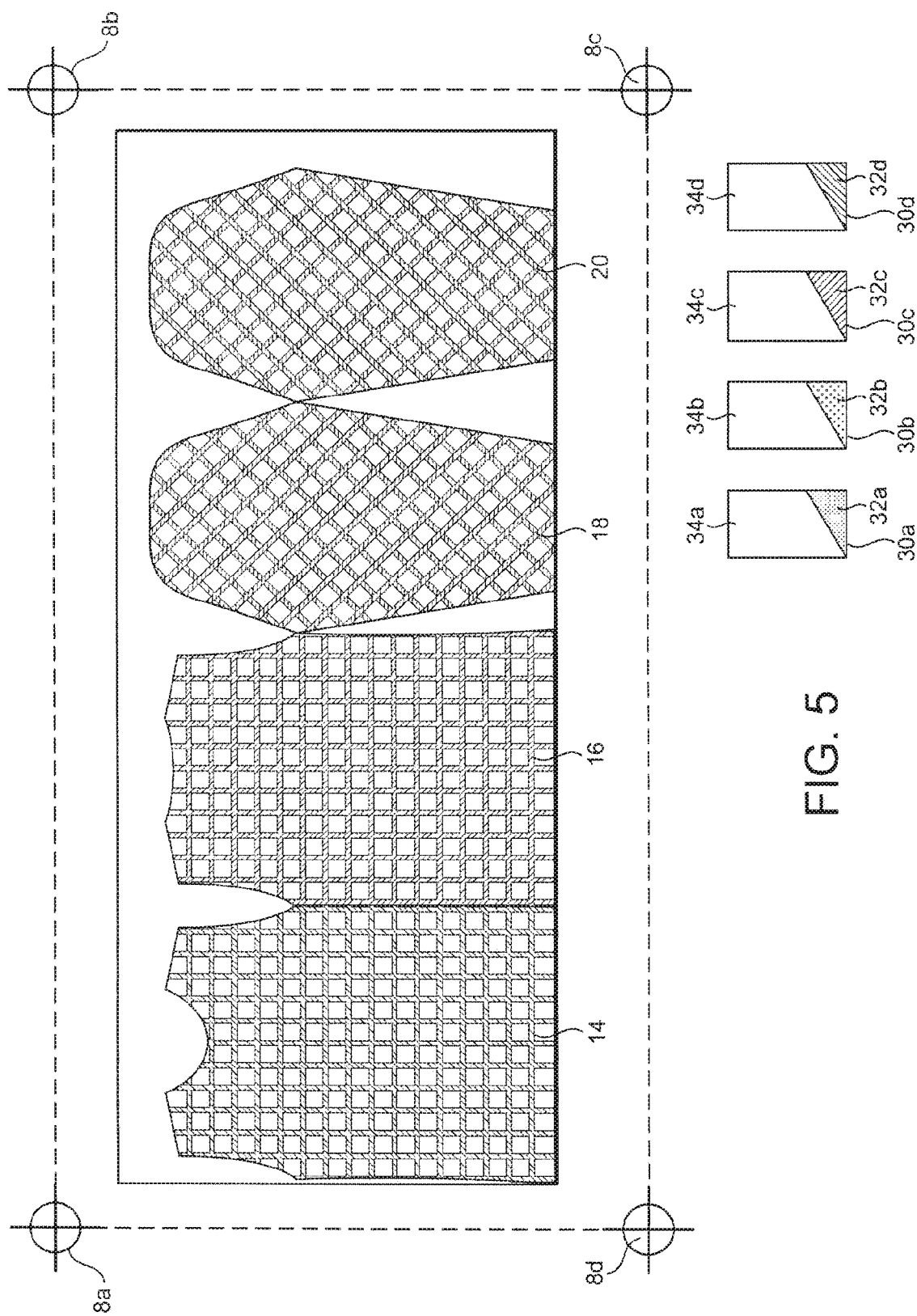
FIG. 5 illustrates icons additionally included with a two-dimensional template.

FIG. 5 illustrates this further. FIG. 5 corresponds to FIG. 4, but additionally shown is a series of icons corresponding to the colours available to be applied to a three three-dimensional image. In this example it is assumed that four colours may be applied to the three-dimensional image, but this is illustrative only. More or less colours may be available, typically more.

As shown in FIG. 5, there is displayed four icons 30*a*, 30*b*, 30*c*, 30*d*. Each icon 30*a*, 30*b*, 30*c*, 30*d* has an associated portion, respectively 32*a*, 32*b*, 32*c*, 32*d*. Each of these portions represents a colour which is available to be applied to three-dimensional image. As shown in FIG. 5 these colours are represented by a dark shading, a light shading, a left-leaning cross hatch, and right-leaning cross hatch respectively, each associated with the portions 32a, 32b, 32c, 32d. Each of these may be identical to a colour used in the parts 14,16,18,20.

In addition, each of the icons 30a, 30b, 30c, 30d has a respective portion 34a, 34b, 34c, 34d. In these portions a user may enter the colour they are using to create the graphic, and by entering it into a particular portion 34a to 34d linking it to a particular colour that is available. When the two-dimensional template is transposed, this colour relationship will be used to apply the graphic to the three-dimensional image.

If the image is applied using a software editing package, then the portions 34a to 34d may be used in the same way, or alternatively these portions may be automatically filled by the software package, illustrating to the user how the colours being used for creating the graphic will be transposed to the three-dimensional image. The software package may allow the user to change the default settings.

The graphic as applied to the pattern may be applied in any way that the user desires. Whilst within the graphic the user may utilise different colours, the user may draft the graphic in such a way that different patterns are applied. Default patterns may be available and applied within the graphic.

In general, the disclosure provides for graphical coding to be applied to a two-dimensional template, which two-dimensional template can then be mapped or transposed to a three-dimensional image.

The application of a colour pattern as the graphic applied to the two-dimensional template, described above, is an example of graphical coding, but the invention is not limited to this example.

The graphical coding may be used to communicate other information as to how an article according to the pattern should be rendered in three-dimensions. Whilst this three-dimensional representation may be a virtual image, it may also be a physical product made according to the two-dimensional template, with the three-dimensional virtual image providing a representation of how the physical product will look.

Colour is one example of physical coding which may be applied to a two-dimensional template. Information relating to structure may also be graphically coded. The two-dimensional template may provide multiple representations of the template, and different coding may be applied to each template.

Figure 6:
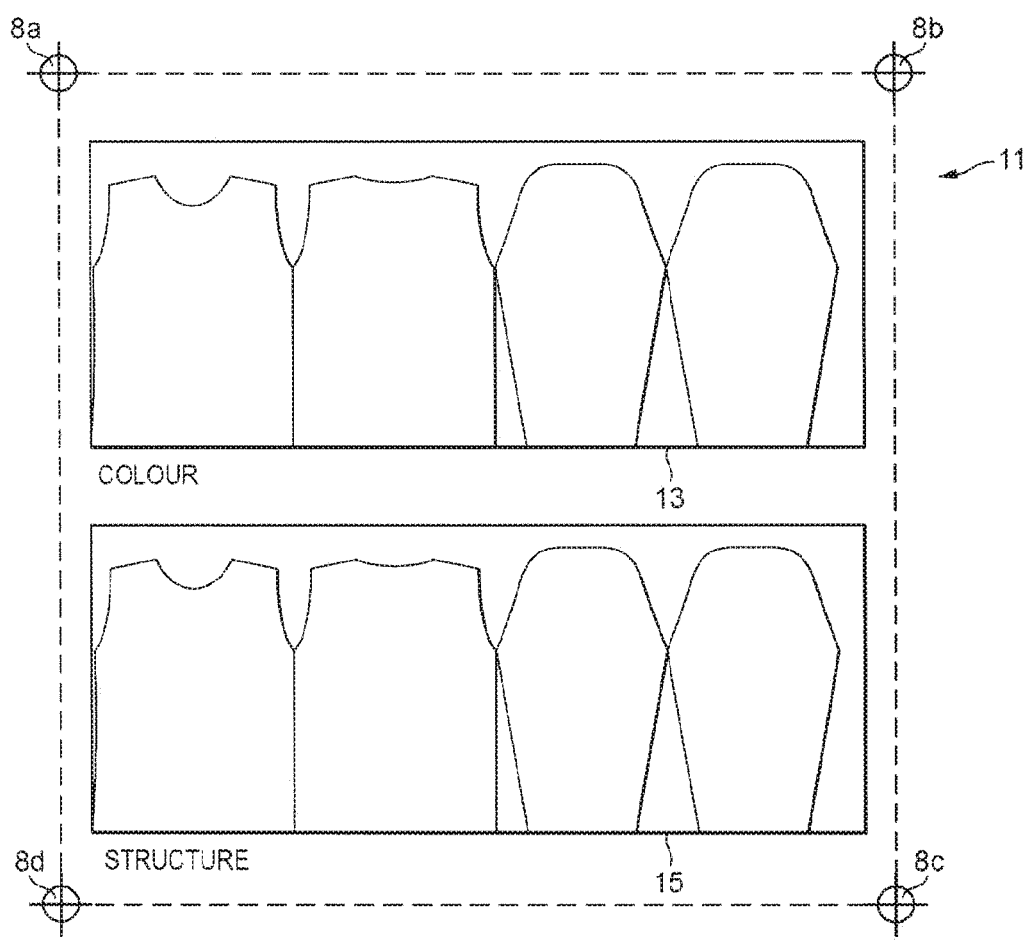
FIG. 6 illustrates an alternative two-dimensional template.

For example, with reference to FIG. 6, a two-dimensional template 11 comprises a first pattern 13 and a second pattern 15. The first pattern may be used to apply a graphic which represents colour to be applied to a three-dimensional image (and/or a three-dimensional article corresponding to the image), and the second pattern may be used to apply a graphic which represents a structure to be applied to the three-dimensional image (and/or the three-dimensional article corresponding to the image).

For example, when the three-dimensional image is an image of an item of clothing, and the item of clothing is to be manufactured according to the two-dimensional template, the structure may define the material to be used for particular parts of the item. The structure may be used to convey information about different material, different surface textures etc. For example, a structure graphic may indicate whether a surface portion is to be raised or recessed.

The type of information which may be conveyed by a graphic will be implementation dependent, and may be chosen in dependence on the article to which the graphic is being applied.

The structure may be defined by use of coloured pens, but the colour is interpreted as having a particular meaning. For instance, for a clothing item, a particular colour may be interpreted as being a particular material type.

The number of patterns provided on a two-dimensional template may be chosen according to the number of different types of graphical coding information is to be captured and transposed.

In arrangements, multiple types of graphical coding may be conveyed on a single pattern, and multiple patterns may not be needed, or the number of patterns may be less than the number of types of graphical coding provided for.

The description herein sets out graphical coding associated with the creation of clothing garments. However in general the pattern represented on the two-dimensional template may be a pattern for any type of item, and the disclosure herein is not restricted to application to clothing items.

When created, the graphic may be comprised of a plurality of components. For example, all parts of the graphic having the same colour may be considered to be the same component. All parts of the graphic having the same pattern may be considered to be the same component. All parts of the graphic having the same colour and the same pattern may be considered to be the same component. In this way, the graphic may be considered as being made up of multiple components. The way in which different components of the graphic are defined may be implementation dependent.

When the graphic is applied to a physical copy of the two-dimensional template, such as paper, then once the graphic is applied the paper copy may be scanned. The scanned paper copy can then be transposed, by mapping, to the three-dimensional image. Once scanned, the template may be imported into a software package that performs the transposing. The scanning may be performed under the control of the software application that does the transposing. The scanned template includes the reference points which are used, as described above, for transposing.

When the graphic is applied to a physical copy of the two-dimensional template, such as paper, then once the graphic is applied an image may be captured of the paper copy. The image may be captured using a camera of a tablet or smartphone device. The captured image can then be transposed, by mapping, to the three dimensional image. The captured image of the template includes the reference points which are used, as described above, for transposing. In an example where an image is captured on the two-dimensional template in this way, it may be important to ensure that the reference points are clearly marked on the two-dimensional template and identifiable from the captured image. Once captured, the template image may be imported into a software package that performs the transposing. The capturing may be performed under the control of the software application that does the transposing.

When the graphic is applied to a digital copy of the two-dimensional image, for example when the two-dimensional image is displayed on a computer display and the computer display image has the graphic applied, then once the graphic is complete the two-dimensional image with the graphic applied may be transposed, by mapping, to the three-dimensional image. The two-dimensional image may be edited under the control of the software application that performs the transposing, or the manipulated two-dimensional image may be transferred to the software application which transposes.

By whichever technique the two-dimensional image template the graphic applied is obtained, once obtained the two-dimensional template with graphic applied is transposed to the three-dimensional image by a software application.

A three-dimensional image is thus created and displayed, which shows the graphic as applied to the three-dimensional image.

In the examples, the two-dimensional template uses Cartesian coordinates. In alternatives, the two-dimensional template may utilise polar coordinates, to allow the two-dimensional template to provide three-dimensional information for mapping to the three-dimensional image. For example, the two-dimensional template may allow for a graphic to be applied in which a drawing radially extends from a point, representing a three-dimensional encoding.

As noted above, one or more elements of the graphic may be defined as components. When the graphic is displayed as applied to the three-dimensional image, a component of the graphic may be selected and changed.

For example, the graphic may have been identified as comprising particular components associated with colour. All elements of the graphic having one particular colour may be identified as a common component. This component may be selected, when applied to the three-dimensional image, and a different colour applied to replace that colour where applied to the image. This is preferably achieved by applying that alteration to the graphic as applied to the two-dimensional template, and then transposing the two-dimensional template with that component appropriately altered.

In another example, a particular colour may be identified as a component only when it is associated with a particular pattern. For example, a particular colour when used with a cross-stripe. This component may be selected, when applied to the three-dimensional image, and a different colour applied to replace that colour where applied to that pattern. Again, this is preferably achieved by applying that alteration to the graphic as applied to the two-dimensional template, and then transposing the two-dimensional template with that component appropriately altered.

The setting of components may comprise determining the dominant colours of the graphic, and setting each dominant colour as a region (a region effectively being a component). The dominant colours can then be changed.

Where a physical three-dimensional object is created, either in parallel with or instead of a creation of a virtual image representing the object, when any changes are made then those changes are applied to the article manufactured. For example if a change is applied to a three-dimensional virtual representation of the image, e.g. displayed on a computer screen, then that change is automatically applied to the three-dimensional object manufactured. This change may be achieved by changing the two-dimensional template on which the three-dimensional virtual image and the physical image manufactured are based, by changing that template based on changes made to the three-dimensional virtual image. Such changes change the choices for manufacturing.

The editing of a selected component may result in a change to the manufacture of an article according to the three-dimensional image, which may be the three-dimensional image. For example where a colour is changed, then the manufactured article is changed to manufacture utilising that changed colour. This may require changing an element of the manufacturing process to allow this change. In the example of a colour change, the manufacturing process may be changed to change to a yarn of a different colour.

As such a region or component of the article can be selected and changed, and then a corresponding change is applied in the manufacturing process to produce a suitably changed manufacturing article.

In an example, based on the two-dimensional template, a three-dimensional virtual image and a three-dimensional physical image (or object) may be created. The three-dimensional virtual image is a representation of what the three-dimensional physical image (or object) will look like. By selecting and changing a region or component of the three-dimensional virtual image, the three-dimensional physical image that is manufactured will change, because the manufacturing is changed based on the change to the three-dimensional virtual image. The three-dimensional physical image and the three-dimensional virtual image can be generated separately or simultaneously.

Advantageously, in certain embodiments, the three-dimensional virtual image is generated based on the two-dimensional template, and the three-dimensional physical image (or object) is not manufactured.

Advantageously, in certain embodiments, the three-dimensional virtual image is generated, and the three-dimensional physical image is manufactured, either simultaneously or after the virtual image is generated.

Advantageously, in certain embodiments, the three-dimensional virtual image is generated, then edited by selecting and changing components or regions, and then the three-dimensional physical image is manufactured with any edits applied to the three-dimensional virtual object incorporated in the manufacturing process to produce a suitably changed three-dimensional physical image.

The graphic as applied to the two-dimensional template is preferably applied to the three-dimensional image as a faithful reproduction. The graphic is not edited, smoothed or tidied up in anyway. Thus if the graphic as applied to the two-dimensional image includes any distortions associated with drawing a straight line by hand, then that distortion will be reproduced when the graphic is applied to the three-dimensional image. In alternatives, some processing may be applied to provide a degree of automation in editing the graphic applied to the two-dimensional template before applying it to the three-dimensional image.

An item conforming to the three-dimensional image can be manufactured. The two-dimensional template associated with the three-dimensional image is available, and this may be provided as an input to automated clothing manufacturing equipment, to manufacture a clothing item from the two-dimensional template with the graphic applied which is represented by the three dimensional image. Any suitable technique for automated manufacturing based on the two-dimensional template may be utilised.

The manufacturing process may determine the colours which can be applied to the three-dimensional image. The colours may correspond to the colours which are available for the manufacturing process.

Any technique for manufacturing a clothing item based on the displayed three-dimensional image, with the two-dimensional template with graphic applied, may be utilised.

It is not required that a three-dimensional representation of a physical object is generated. The three-dimensional physical object may itself be the image, and may be manufactured directly from the two-dimensional template without a virtual representation of the image being presented on a computer display for example.

Figure 7:
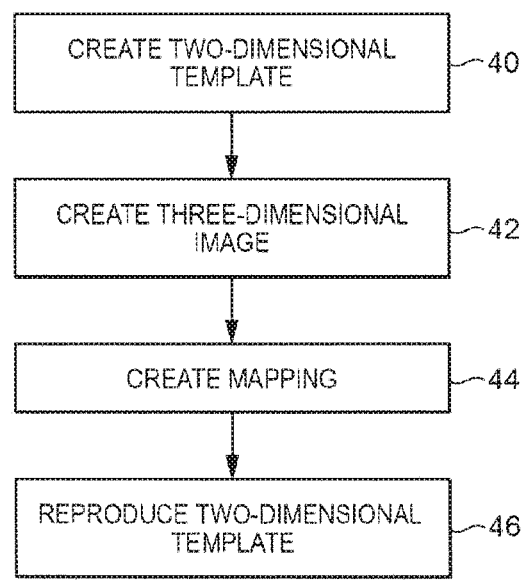
FIG. 7 illustrates a process flow for creating a mapping.

A process is described with further reference to FIG. 7 for creating a two-dimensional template.

In a step 40, a two-dimensional template is created, having a pattern including two-dimensional representations of the shapes needed to create a three-dimensional image.

In a step 42, the three-dimensional image based on the two-dimensional template is created.

The two-dimensional template and the three-dimensional image based on the two-dimensional template may be created in a different order: the three-dimensional image may be created first, and the two-dimensional template including the pattern to create the three-dimensional image may then be created. This exercise may be a manual exercise, in so far as the appropriate template needs to be created manually for the image.

In a step 44, a mapping is created between the two-dimensional template and the three-dimensional image. Creating this mapping includes defining the reference points for the two-dimensional template, to allow each point on the pattern of the two-dimensional template to be mapped to a point on the three-dimensional image.

In a step 46, the two-dimensional template is reproduced. This may be by printing a two-dimensional template, or by displaying the two-dimensional template.

Figure 8:
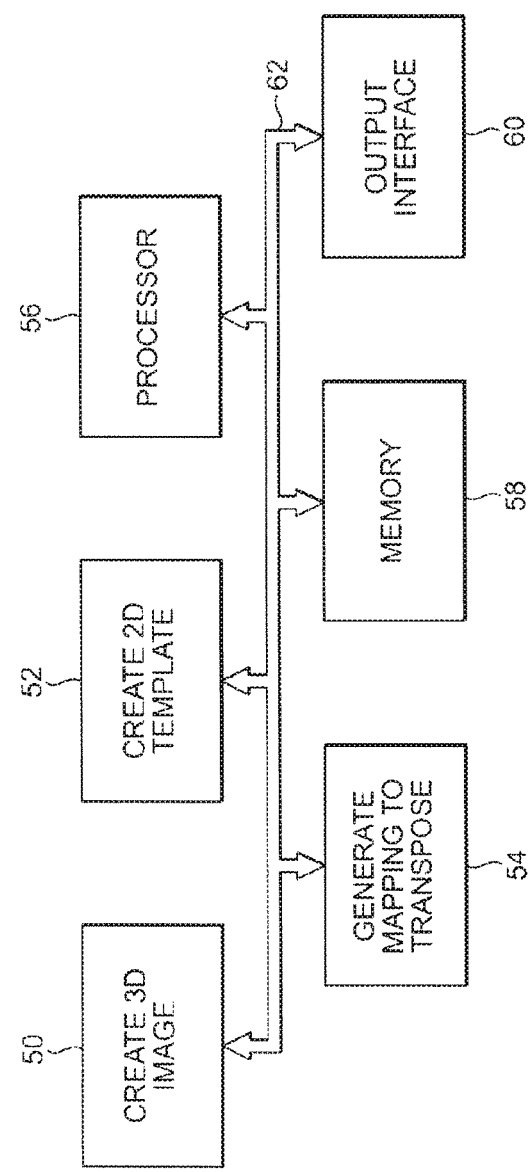
FIG. 8 illustrates circuitry for the process flow of FIG. 7.

FIG. 8 illustrates the elements of a computer system required for implementing the process of FIG. 7. As shown, a functional block is controlled to create a three-dimensional image, and a functional block 52 is controlled to create a two-dimensional template. A functional block 54 is used to generate the mapping to transpose the two-dimensional template into the three-dimensional image. The functional blocks 50, 52, 54 operate under the control of a processor 56. The created three-dimensional image and two-dimensional template or stored in a memory 58 together with the generated mapping, under the control of the processor 56. The created two-dimensional template is output using an output interface 60. The elements of FIG. 8 are interconnected using a communication interface 62.

Figure 9:
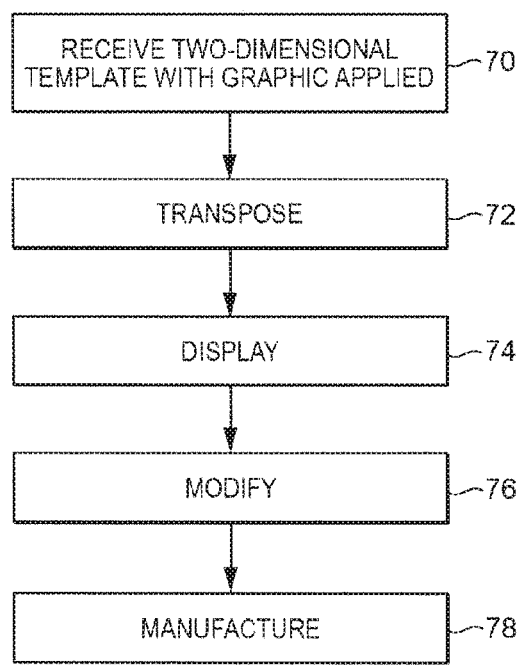
FIG. 9 illustrates a process flow for creating a three-dimensional image.

A process is described with further reference to FIG. 9 for processing a two-dimensional template.

In a step 70, a two-dimensional template with a graphic applied is received. As noted above, this may be received by scanning, capturing an image, and/or transferring a digital file. There is thus created a two-dimensional template with graphic applied file.

In a step 72, this two-dimensional template with graphic applied file is transposed in accordance with the known mapping between the two-dimensional template and the three-dimensional image.

In step 74, the three-dimensional image is displayed.

In step 76, the three-dimensional image may be modified, for example by selecting a component or region, and adapting its colour. In practice a user may select the component or region of the displayed three-dimensional image, and apply a change. The application will then apply this change to graphic applied to the two-dimensional template, and reproduce the three-dimensional image.

In step 78, an item according to the three-dimensional image may be manufactured, for example by transmitting the associated two-dimensional template with graphic applied to an appropriate automated manufacturing process.

Figure 10:
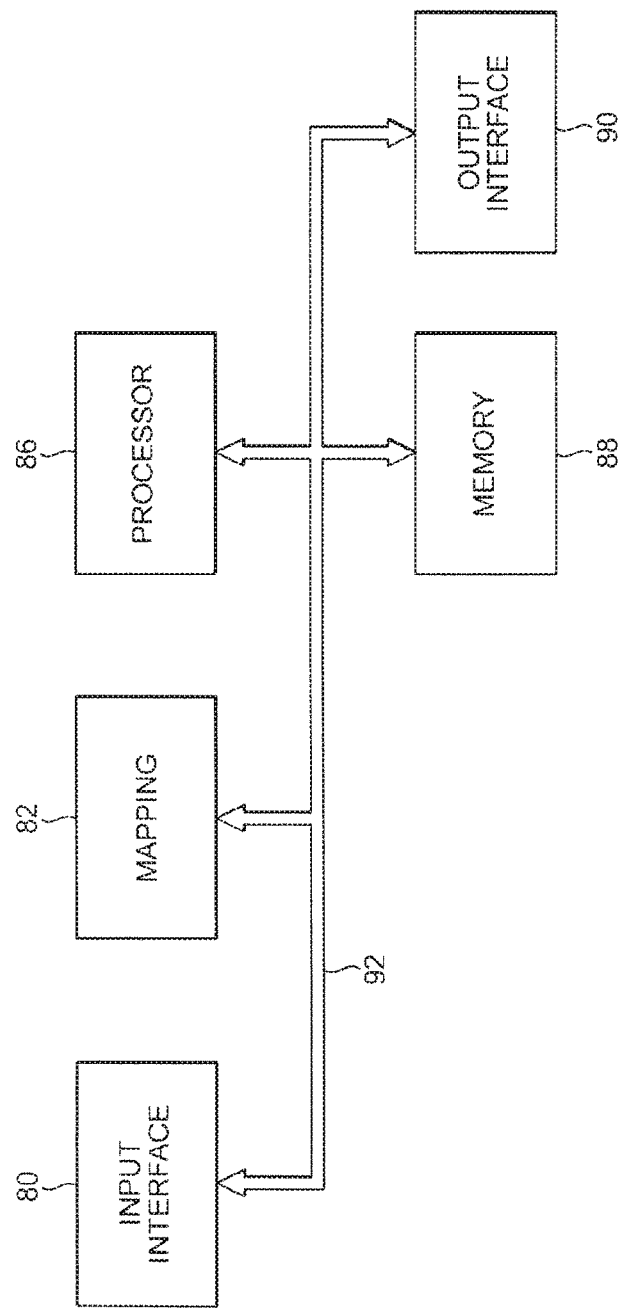
FIG. 10 illustrates circuitry for the process flow of FIG. 9.

FIG. 10 illustrates the elements of a computer system required for implementing the process of FIG. 9.

The two-dimensional template with a graphic applied file is received at an input interface 80. This two-dimensional template with graphic applied file is transposed in accordance with the known mapping between the two-dimensional template and the three-dimensional image by a mapping block 82. A three-dimensional image is created, and stored in the memory 88. The created three-dimensional image is also output by an output interface 90 for display. Any modifications to the three-dimensional image are received by the input interface 80, and the stored three-dimensional image in memory is modified as necessary. The output interface may also be used to transmit the two-dimensional template with the graphic applied to be manufactured. All of the elements of FIG. 10 operate under the control of the processor 86, and are interconnected via communication lines 92.

Various aspects of that which has been disclosed may be implemented in software. To the extent that any aspect is implemented in software, the associated processes may be implemented as computer program code. The computer program code associated with any aspect may be stored in memory, and when execute the computer program code may cause a computer to operate in accordance with any process described. The memory on which computer program code is stored may be memory of a computer system, portable memory, or both.

The embodiments and disclosure above have been described by way of reference to particular example scenarios. However, the invention is not limited to these examples, nor is it limited, to the details of any example or embodiment set out hereinabove, nor is it limited to the combination of any features of any example or embodiment as set out above. Instead, the invention shall only be limited by the claims that appear below.

The invention claimed is:

1. A method of creating a three-dimensional image of an article of clothing, the method comprising:
   establishing a mapping between a two-dimensional template defining a pattern for the article of clothing and the three-dimensional image;
   applying a graphic to the two-dimensional template of the article of clothing;
   receiving the two-dimensional template with the graphic applied;
   creating the three-dimensional image based on the mapping of the two-dimensional template and the three-dimensional image and the applied graphic;
   mapping a plurality of points of the two-dimensional template to a respective plurality of points of the three-dimensional image; and
   mapping a plurality of points of the graphic applied to the two-dimensional template defining the pattern for the article of clothing to the three-dimensional image based on said mapping of the plurality of points of the two-dimensional template to the respective plurality of points of the three-dimensional image, wherein the method further comprises:
   mapping a plurality of predetermined points of the two-dimensional template to a respective plurality of predetermined points on the three-dimensional image;
   based on said mapping of the plurality of predetermined points of the two-dimensional template to the respective plurality of predetermined points on the three-dimensional image, mapping a plurality of points of the graphic applied to the two-dimensional template to the three-dimensional image; and
   defining a plurality of reference points on the two-dimensional template, wherein the plurality of reference points provides a unique code for that two-dimensional template so as to uniquely identify the two-dimensional template,
   wherein the plurality of reference points additionally define a reference grid for the mapping of positions on the two-dimensional template to positions on the three-dimensional image.

2. The method of claim 1, further comprising:
transposing the two-dimensional template to the three-dimensional image with the graphic applied thereto.

3. The method of claim 1, further comprising:
applying the graphic to the two-dimensional template by hand.

4. The method of claim 3, further comprising:
scanning the two-dimensional pattern after applying the graphic.

5. The method of claim 1 further comprising:
applying the graphic to the two-dimensional template using a computer tool.

6. The method of claim 1 wherein the image comprises a plurality of components and wherein the method comprises:
selecting a component of the graphic; and
editing the selected component.

7. The method of claim 6 wherein editing the selected component comprises:
selecting a color, and
applying the selected color to the component.

8. The method of claim 6 wherein editing the selected component comprises:
selecting a pattern; and
applying the selected pattern to the component.

9. The method of claim 6 wherein selecting the component comprises selecting the component on the three-dimensional image.

10. The method of claim 1 further comprising manufacturing an article corresponding to the three-dimensional image.

11. The method of claim 1 wherein the graphic is a coding representing editing to be applied to the three-dimensional image.

12. The method of claim 1 wherein the graphic is a structure graphic.

13. The method of claim 12 wherein the structure graphic defines the material to be used for particular parts of the item.

14. The method of claim 12 wherein the structure graphic indicates whether a surface portion is to be raised or recessed.

15. The method of claim 12, wherein the reference points of the two-dimensional template are provided as distinct visible points, separate to the pattern for the article of clothing.

16. The method of claim 15, wherein the reference points of the two-dimensional template are provided externally to the area of the pattern.

17. A non-transitory computer-readable medium for storing computer program code which, when executed on a computer, performs the method of claim 1.

18. A computer for creating a three-dimensional image, the computer being configured to execute the method of claim 1.

19. A method for creating a three-dimensional image, comprising:
providing a two-dimensional template, the two-dimensional template defining a pattern for an article of clothing and having a plurality of reference points such that each point on the two-dimensional template maps to a point on a three-dimensional image; and
applying coding to the two-dimensional template by adding graphical information to the three-dimensional image,
wherein the plurality of reference points uniquely identify the template, and
wherein the plurality of reference points provides a unique code for that two-dimensional template so as to uniquely identify the two-dimensional template, and additionally define a reference grid for the mapping of positions on the two-dimensional template to positions on the three-dimensional image.

* * * * *